UNITED STATES PATENT OFFICE.

JOANNÈS CHRISTOPHE, OF LYON, FRANCE.

PROCESS FOR MANUFACTURING BRILLIANT CELLULOSE THREADS.

1,184,323.   Specification of Letters Patent.   Patented May 23, 1916.

No Drawing.   Application filed March 6, 1915.   Serial No. 12,553.

*To all whom it may concern:*

Be it known that I, JOANNÈS CHRISTOPHE, a citizen of the French Republic, residing at Lyon, in France, have invented new and useful Improvements in Processes for Manufacturing Brilliant Cellulose Threads, of which the following is a specification.

Processes are known for the treatment of cellulose threads for the purpose of imparting to them a brilliant appearance, such processes consisting in transforming the cellulose firstly into alkali cellulose and then into cellulose xanthate by the reaction of carbon bisulfid and finally regenerating the cellulose by decomposition of the xanthate. Such processes do not allow of obtaining homogeneous products, as the sulfid is not fixed in a regular and uniform manner on the alkali cellulose. Further it is difficult to employ apparatus which are sufficiently gas tight to prevent escape of the carbon bisulfid. Consequently there is a constant danger during the operations, of inflammation, etc., due to the escape of vapors of carbon bisulfid during the treatment of the cellulose threads. Finally the losses of carbon bisulfid increase to a certain amount the cost of the process since it is necessary to use a larged quantity of carbon bisulfid than is theoretically necessary for the formation of xanthate of cellulose.

The process forming the object of the present invention obviates the above inconveniences.

One of the essential features of the process consists in operating the transformation of the alkali cellulose into xanthate by the carbon bisulfid in vacuum.

Another feature consists in the purification of the brilliant threads of cellulose obtained after regeneration of the cellulose from its xanthate combination. In fact: after the above operation there is a precipitation on the threads of sulfur and sulfids which partially conceal the brilliancy and the transparency of the threads while taking away some of the suppleness and elasticity thereof by causing the adherence of the elementary fibers to one another. It is consequently necessary to free the threads from these impurities which would otherwise possibly cause trouble during dyeing or dressing of the threads.

The improved process can be carried out as follows:—The threads preferably in the form of skeins are submitted to a caustic soda solution for the time necessary to transform the cellulose into alkali-cellulose. Solutions 20° to 30° Baumé are quite suitable. The threads are then treated in a revolving apparatus so as to eliminate the greater part of the excess of soda solution. Practically the weight of soda solution at 20°–30° Baumé retained by the threads is equal to about twice the weight of these threads. The skeins of threads transformed into alkali-cellulose are then placed in a vacuum, the vacuum being made as perfect as possible, that is to say, at a pressure of a few millimeters of mercury only, (in practice about 70). By means of a suitable device and by means of a gage a quantity of carbon bisulfid which is always the same and corresponding to 15 to 30% of the weight of the threads treated, is introduced into the vacuum. This carbon bisulfid vaporizes and the vapors react regularly and uniformly on the alkali-cellulose to transform it into xanthate of cellulose. The skeins are left in the vacuum until all the carbon bisulfid is absorbed which is assured by testing a sample of the vacuum gas. At a temperature of 20° centigrade it takes about 5 hours to fix the quantity of carbon bisulfid indicated above. The vacuum apparatus can be provided exteriorly with a regulator device of known kind allowing the operation to be carried on at a determined constant temperature during the whole time taken for the transformation of the alkali-cellulose into xanthate. When all the carbon bisulfid is fixed, air is admitted into the vacuum chamber, the skeins are removed and hung on the arms of a stretching frame. The threads which by reason of the transformation into xanthate are considerably contracted and have acquired great elasticity, are stretched so as to give them nearly their original length. The cellulose is then regenerated from its xanthic combination by the usual methods, such as treatment by the action of mineral or organic acid, ammonium salts, acid salts such as bisulfates of sodium or potassium, etc., or alkaline solutions. To obtain very supple threads and to increase their elasticity the regenerating liquid is employed at a temperature of 65° centigrade or more.

After regeneration the threads will be found to have acquired brilliancy and transparency without loss of tenacity and elasticity. They are, however, not suitable for use at this stage and must be submitted to several cleansing operations, as mentioned above. These are effected by eliminating the sulfur by the action of a solution of sulfid of sodium employed preferably at a temperature of about 70° centigrade. The threads are then washed in boiling water, then treated with a solution of hydrochloric acid or any other diluted mineral acid which will decompose the sulfid. The cleansing is finished by prolonged washing in hot water to eliminate the last traces of acid. The threads thus treated and purified have a brilliant and transparent appearance comparable to that of natural or artificial silk of the same texture. This brilliancy is durable and resists the action of repeated washings or boilings. The suppleness of the threads is also comparable to that of natural or artificial silk of the same texture. They constitute a homogeneous substance taking dye evenly; they absorb coloring substances better than the same threads not so treated. It is possible by repeating the treatment of the whole process to further increase the brilliancy of the threads and their capacity of absorbing coloring substances without damage to their other qualities.

Example: After having been transformed into xanthate, regenerated after stretching and cleansed, the threads are submitted to a second identical treatment and are then freed from the impurities precipitated during regeneration. The threads thus obtained are more brilliant, more transparent and more supple than those submitted to a single treatment and they absorb coloring matters better. Instead of twice, the treatment can be repeated three, four or five times, an extra improvement being obtained each time.

Practically two consecutive treatments are used to obtain good results with threads composed of fine fabrics (cotton), the resulting thread being very brilliant and having considerable power to absorb dyes. The advantage of repeating the treatment several times is very noticeable for threads with coarse fibers (linen, hemp, jute, ramie, etc.)

What I claim as my invention and desire to secure by Letters Patent of the United States is:—

1. Process for manufacturing brilliant cellulose threads consisting in treating threads of natural cellulose with caustic solution to transform the cellulose into alkali-cellulose, then eliminating the excess of solution (for instance with a hydro-extractor), then treating said threads in a vacuum with carbon bisulfid to convert the cellulose into cellulose xanthate and then regenerating the cellulose from its xanthic combination.

2. Process for manufacturing brilliant cellulose threads consisting in treating threads of natural cellulose with caustic solution to transform the cellulose into alkali-cellulose, then eliminating the excess of solution from said threads, then treating said threads *in vacuo* with carbon bisulfid to convert the cellulose into cellulose xanthate, regenerating the cellulose from its xanthic combination and finally removing the impurities from said threads.

3. Process for manufacturing brilliant cellulose threads, consisting in treating threads of natural cellulose with caustic solution at 20° to 30° Baumé, then eliminating the excess of said solution from said threads, treating said threads at a constant temperature *in vacuo* with an amount of carbon bisulfid equal to 15 to 30% of the weight of the thread regenerating the cellulose and finally removing the impurities from said threads.

4. Process for manufacturing brilliant cellulose threads, consisting in treating threads of natural cellulose with caustic solution at 20° to 30° Baumé, eliminating the excess of solution from such threads, treating said threads at a constant temperature *in vacuo* with an amount of carbon bisulfid equal to 15 to 30% of the weight of the threads, stretching the threads, regenerating the cellulose by treatment with a regenerating solution at a temperature of 65° centigrade or more, treating the threads with a solution of sulfid of sodium, washing the threads in boiling water, then treating them with a solution of mineral acid and finally washing said threads in hot water to eliminate the acid.

5. Process for manufacturing brilliant cellulose threads consisting in treating threads of natural cellulose with caustic solution to transform the cellulose into alkali cellulose then eliminating the excess of said solution from said threads, then treating said threads *in vacuo* with carbon bisulfid to convert the cellulose into cellulose xanthate, regenerating the cellulose from its xanthic combination, repeating the above process a plurality of times according to the nature of the fibers (fine or coarse) constituting the threads, and finally removing the impurities from said threads.

In testimony whereof I have signed my name to this specification in the presence of two subscribing witnesses.

JOANNÈS CHRISTOPHE.

Witnesses:
 GASTON JEANNIAUX,
 JOSEPH BATTIER.